July 10, 1923.  1,461,516

E. G. BUSSE

SUPPORT FOR CLASP BRAKE BEAMS

Filed Aug. 31, 1922

Inventor.
EDWIN G. BUSSE.

Patented July 10, 1923.

1,461,516

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

SUPPORT FOR CLASP BRAKE BEAM.

Application filed August 31, 1922. Serial No. 585,511.

*To all whom it may concern:*

Be it known that I, EDWIN G. BUSSE, a citizen of the United States, residing at Chicago, county of Cook, and State of Illinois, have invented a certain new and useful Improvement in Supports for Clasp Brake Beams, of which the following is a full, clear, and exact description, such as will enable others skilled in the art to which it appertains to make and use the same, reference being had to the accompanying drawings, forming part of this application.

My invention relates to railroad rolling stock and consists in an improvement in brake beam supports especially adapted to form a third or fourth point support for brake beams in a clasp brake system.

In the use of my invention, a single support member is used to uphold both of the brake beams located on opposite sides of the same axle and wheels, and while this support may be mounted in different ways, I illustrate a preferred construction in the accompanying drawings, in which—

Figure 1:
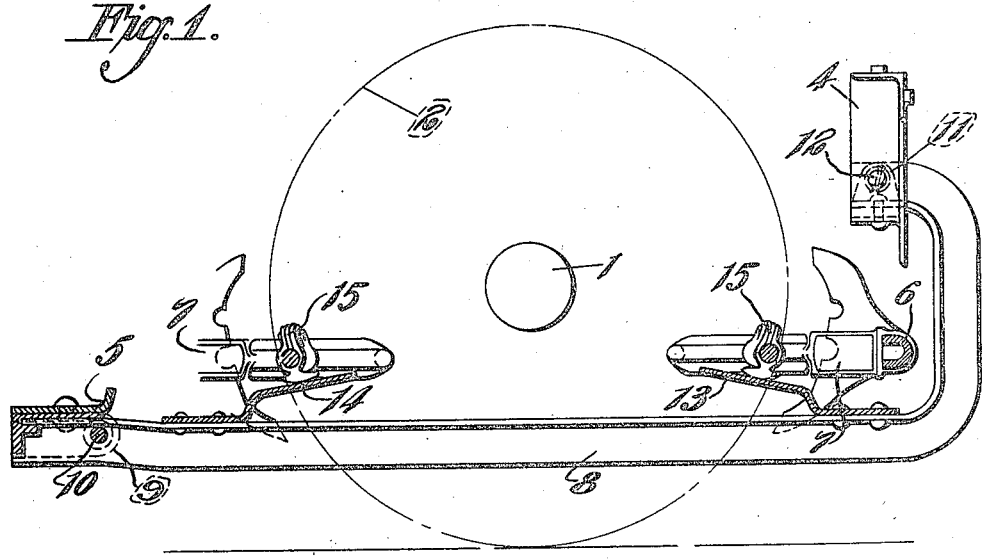
Figure 1 is a side elevation of one end of a truck equipped with clasp brakes.

The truck has the usual axle 1, wheels 2, a side frame 3, an end cross member 4, a spring plank 5, and brake beams 6 and 7 located on opposite sides of wheels 2.

Secured to spring plank 5 and to the end member 4 of the truck frame is a supporting element 8 extending substantially horizontally from the level of the spring plank to the end of the truck and then upwardly to end member 4. Element 8 is here shown as an angle iron having its inner end secured in a suitable bracket 9 on spring plank 5 by means of a cotter pin 10. The outer end of the angle 8 is similarly secured to end member 4 of the truck frame by a bracket 11 and pin 12. By removal of the pins 10 and 12, the angle may be easily removed from the truck.

While the brake beams 6 and 7 could be supported directly upon angle 8, I prefer to provide individual yielding inclined supporting members 13 and 14, respectively, which engage sliding chairs 15 on the beams. This form of support is familar to those acquainted in the art and insures the presentation of the entire face of the brake shoe to the wheel irrespective of the wear on the shoe or the wheel tire.

Figure 3:
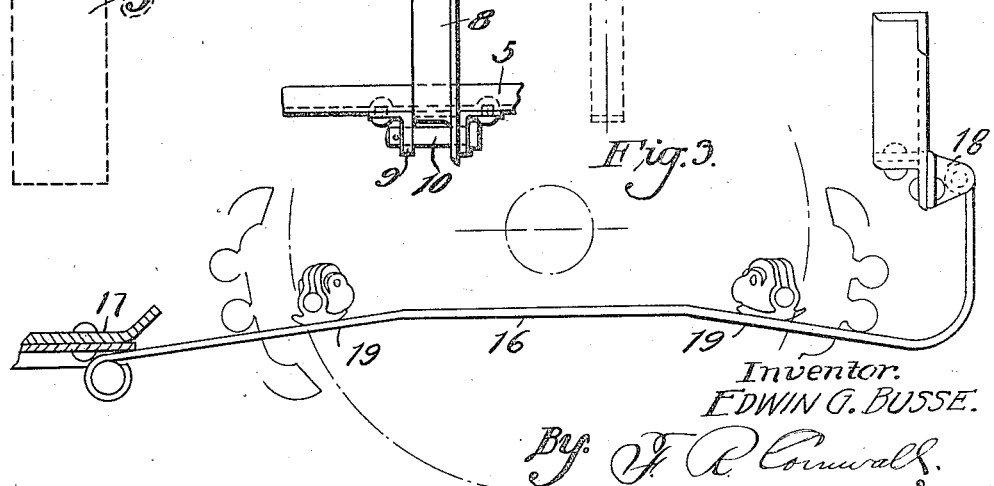
Figure 3 is a side elevation of a modified construction.

In the modification illustrated in Figure 3 a single supporting element 16 is shown as extending from the spring plank 17 to the truck frame bracket 18. This member is shown as having inclined portions 19 beneath the brake beams and is preferably formed of spring material although a rigid member could be substituted therefor, if desired.

Figure 2:
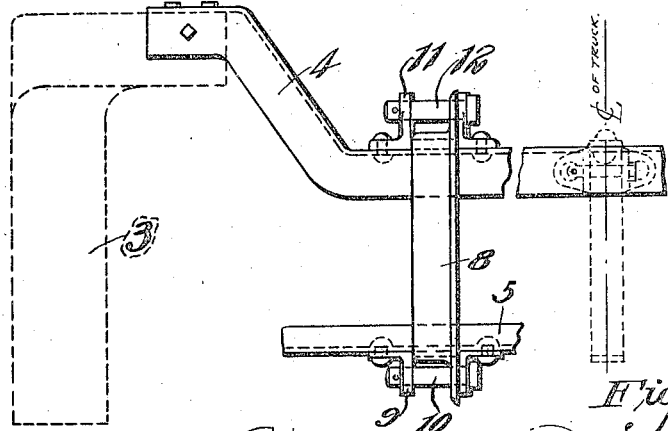
Figure 2 is an end view of a portion of the truck shown in Figure 1 with the wheels and brake beams omitted.

In Figure 2, member 8 is shown as spaced from the center line of the truck so that it and a corresponding member located on the opposite side of the truck would form fourth point brake beam supports. Obviously a single member could be located at the center of the truck, thereby providing a third point support. Such an arrangement is indicated in dotted lines in Figure 2.

I contemplate these and other such modifications in my invention as fall within the scope of the appended claims.

I claim:

1. In a truck, a truck frame, a spring plank, and a brake beam support having its opposite ends mounted on said frame and spring plank.

2. In a truck, a truck frame, a spring plank spaced from the end of said frame, an axle and wheels located between said spring plank and the end of the frame, and a brake beam support having one end mounted on said spring plank and the opposite end mounted on the end of said frame.

3. In a truck, a transverse end member, a transverse spring plank, a member secured to said spring plank, extending longitudinally of the truck to the end thereof, then upwardly and secured to said end member, and a plurality of brake beams supported thereon.

4. In a truck, a member extending longitudinally of the truck, and a plurality of brake beams, located on opposite sides of an axle and wheels, supported on said member.

5. In a clasp brake arrangement, a common third or fourth point support for both brake beams applied to the same pair of wheels.

6. In a clasp brake arrangement, a member extending beneath brake beams located at opposite sides of an axle and wheels, and spaced oppositely inclined beam supporting surfaces on said member.

7. A third or fourth point support for a brake beam comprising a member adapted to be supported at its opposite ends upon the spring plank and the end of the truck, respectively, and means for detachably securing said member to its supports.

8. A brake beam support comprising a member extending in opposite directions beneath an axle and wheels, and respective yielding members extending upwardly and inwardly beneath brake beams located on either side of the axle and wheels.

9. A brake beam support for clasp brake arrangements comprising a common support extending under both beams on opposite sides of an axle and wheels, and providing a yielding support for each beam.

10. A brake beam support for clasp brake arrangements comprising a common support extending under both beams on opposite sides of an axle and wheels, and providing oppositely inclined yielding supporting surfaces for the two beams.

11. A brake beam support for clasp brake arrangements comprising a common support extending under both beams on opposite sides of an axle and wheels, and providing individually yielding supporting surfaces for both beams.

12. A brake beam support for clasp brakes comprising a common support member extending under both beams on opposite sides of an axle and wheels, and detachable brake beam supporting elements mounted thereon.

13. A brake beam support for clasp brakes comprising a common support member extending under both beams on opposite sides of an axle and wheels, and individual detachable yielding support elements for each beam mounted on said member.

In testimony whereof I hereunto affix my signature this 22nd day of August, 1922.

EDWIN G. BUSSE.